US008490968B2

(12) United States Patent
Kokubo

(10) Patent No.: US 8,490,968 B2
(45) Date of Patent: Jul. 23, 2013

(54) IMAGE FORMING APPARATUS WITH CONVEYANCE INTERVAL ADJUSTMENT FOR RECORDING PAPER

(75) Inventor: Yoshitaka Kokubo, Susono-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1382 days.

(21) Appl. No.: 11/828,524

(22) Filed: Jul. 26, 2007

(65) Prior Publication Data

US 2008/0024827 A1 Jan. 31, 2008

(30) Foreign Application Priority Data

Jul. 27, 2006 (JP) ................................ 2006-204595

(51) Int. Cl.
*H04N 1/409* (2006.01)

(52) U.S. Cl.
USPC ..... 271/259; 271/111; 271/265.03; 358/1.12; 399/21

(58) Field of Classification Search
USPC ........ 358/1.12; 271/111, 259, 265.03; 399/21
See application file for complete search history.

(56) References Cited

U.S. PATENT DOCUMENTS 4,944,505 A * 7/1990 Sherman, III ............ 271/265.03
6,145,376 A * 11/2000 Elgee .............................. 73/159
6,804,474 B2 * 10/2004 Morita et al. .................... 399/23
2004/0251589 A1 * 12/2004 Satoh et al. ................ 271/10.01
2005/0074248 A1 * 4/2005 Akita et al. ...................... 399/45
2005/0201808 A1 * 9/2005 Barry et al. .................... 400/679

FOREIGN PATENT DOCUMENTS

JP 8-137340 5/1996
JP 2001-031289 A 2/2001
JP 2002-139967 A 5/2002
JP 2003-176045 A 6/2003
JP 2006-117363 A 5/2006

OTHER PUBLICATIONS

Office Action in corresponding Japanese Patent Application No. 2007-191015 dated Nov. 23, 2011.

* cited by examiner

*Primary Examiner* — Peter K Huntsinger
(74) *Attorney, Agent, or Firm* — Fitzpatrick, Cella, Harper & Scinto

(57) ABSTRACT

When a trailing edge detection sensor is affected by toner, dust, etc. adhered on an optical path thereof or when the sensor fails, malfunction of the apparatus is prevented from happening by measuring the size of a record material only with a unit for detecting a leading edge. The image forming apparatus has a unit for leading edge detection adapted to detect the leading edge of the record material and a unit for trailing edge detection adapted to detect the trailing edge of the record material, and is configured to, when the unit for trailing edge detection falls in detection capability or fails, form an image and measure the size of the record material only with the unit for leading edge detection.

20 Claims, 14 Drawing Sheets

IMAGE FORMING APPARATUS WITH CONVEYANCE INTERVAL ADJUSTMENT FOR RECORDING PAPER

BACKGROUND OF THE INVENTION

1. Field of the Invention

The present invention relates to an image forming apparatus, and more specifically, to a device for measuring a size of a record medium used in the image forming apparatus, such as copiers and laser printers.

2. Description of the Related Art

The image forming apparatuses that include the copier, the laser printer, etc. have each an image formation unit. The image formation unit has a latent image carrier for carrying a latent image and a developing device that renders the latent image visible as a developer image by giving a developer to the latent image carrier. Moreover, the image forming apparatus has transfer means for transferring the developer image by the developing device onto record material being conveying to a predetermined direction. Furthermore, the image forming apparatus has a fixing device that fixes the developer image on the record material by heating and pressurizing the record material to which the developer image is transferred by the transfer means under predetermined fixing processing conditions.

Conventionally, in such an image forming apparatus, as means for detecting a leading edge and a trailing edge of the record material, the size of the record material is found and existence/absence of the record material is detected by a combination of an optical sensor and an actuator (e.g., a flag) as a unit for detecting the leading edge and the trailing edge of the record material.

However, in order to increase a conveyance speed to a higher speed and thereby shorten a first print output time, there is a device for conveying the record material with as narrower a conveyance interval (a distance between pieces of the record material) as possible. In such an apparatus, it is conceivable that the leading edge of the record material is detected by a combination of the optical sensor and the actuator and the trailing edge is detected by a combination of a sensor for record medium discrimination and an LED (light-emitting diode) disposed facing the sensor for record medium discrimination across the record medium, in which the sensor receives transmitted light passing through the record material.

In detecting the trailing edge of the record medium, when the conveyance speed of the record material becomes fast; after the trailing edge of the record medium escaped from the flag, there flapping occurs slightly until the flag returns to an initial position. Therefore, it takes longer time until the trailing edge detection is established as the conveyance speed becomes faster.

Therefore, if the trailing edge of the record material is detected using the sensor for record medium discrimination at a timing at which the sensor receives light from the LED disposed at the opposed position, a time until the detection is established becomes short compared with a case of using a flag etc.

Technical contents related to the conventional technology as described above are disclosed. For example, Japanese Patent Laid-Open No. 8-137340 describes, as a sensor for detecting the leading edge of the record material, a construction that uses a transmission member that operates when the leading edge of the record material abuts against it and an optical sensor for detecting an operational state of the transmission member. It further describes that by the operation of the transmission member, the leading edge of the record material is detected and it is detected whether the record material is a transparent feed form according to whether the record material transmits the light by the optical sensor.

However, in the case where trailing edge detection of the record material is performed by means of the quantity of transmitted light, it is also expected that detection accuracy in the trailing edge detection of the record material may be lowered due to failure or degradation of the LED making the transmitted light, due to failure of the discrimination sensor, or due to toner, dust, etc. adhered on the optical path of the transmitted light. Moreover, as a result, there is also a conceivable possibility that the size of the record material cannot be found.

SUMMARY OF THE INVENTION

The present invention is made in view of such a problem, and has as its object to provide an image forming apparatus that can prevent malfunction of the apparatus from happening.

In order to attain such an object, the image forming apparatus of the present invention image has an image formation unit for forming an image on record material, a conveyance unit for conveying the record material, a first detection unit for detecting existence/absence of the record material, a second detection unit for detecting the type of the record material, and a size detection unit for measuring the size of the record material by detecting a leading edge of the record material before conveyance with the first detection unit and detecting a trailing edge of the record material with the second detection unit, characterized in that the size measuring unit measures the size of the record material by detecting the leading edge and the trailing edge of the record material using only the first detection unit based on an output from the second detection unit.

In order to attain the object, the image forming apparatus of the present invention has the image formation unit for forming an image on the record material, the conveyance unit for conveying the record material, the first detection unit for detecting existence/absence of the record material, the second detection unit for detecting the type of the record material, and the size measuring unit for measuring the size of the record material by detecting the leading edge of the record material before being conveyed by the first detection unit and detecting the trailing edge of the record material by the second detection unit, characterized in that depending on the type of the record material detected by the second detection unit, the image forming apparatus determines which to take: detecting the leading edge and the trailing edge of the record material using only the first detection unit to measure the size of the record material, or detecting the leading edge and the trailing edge of the record material using the first detection unit and the second detection unit to measure the size of the record material.

With the above a configuration, the image forming apparatus measures the size of the record material only with a unit of detecting the leading edge, even in the case of a failure of an LED or being affected by toner, dust, etc. adhered on an optical path. Moreover, the image forming apparatus has a system in which the leading edge of the record material is detected by a combination of an optical sensor and an actuator, and the trailing edge is detected by the optical sensor. In this a configuration, when toner, dust, etc. adhere on the optical path of the transmitted light, or when the trailing edge cannot be detected because of failure of an optical sensor for trailing edge detection, a paper interval between pieces of the record material is widened so that the leading edge of the next record material can be detected, and the leading edge and the trailing edge are detected only by the actuator and the optical sensor.

According to the present invention, an effect of preventing malfunction in operations of the apparatus from happening is achieved.

Further features of the present invention will become apparent from the following description of exemplary embodiments (with reference to the attached drawings).

BRIEF DESCRIPTION OF THE DRAWINGS

FIGS. 3A to 3C are diagrams each showing timing when a paper interval is widened, in which FIG. 3A shows that the trailing edge of the paper can be detected by paper crossing an optical path of an LED; FIG. 3B shows that it becomes possible to measure paper size by detecting a leading edge and a trailing edge only with a paper edge detection sensor; and FIG. 3C shows that a paper interval is widened to one that is equal to or more than a minimum paper interval;

FIGS. 12A to 12C are diagrams for explaining a configuration of an actuator mechanism according to the present invention, in which FIG. 12A shows that a flag of a sensor contacts the leading edge of a record medium and turns; FIG. 12B shows that one end of the flag interrupts a photo interrupter; and FIG. 12C shows that the flag flaps and repeats to interrupt the photo interrupter and turns off it;

DESCRIPTION OF THE EMBODIMENTS

Figure 1:
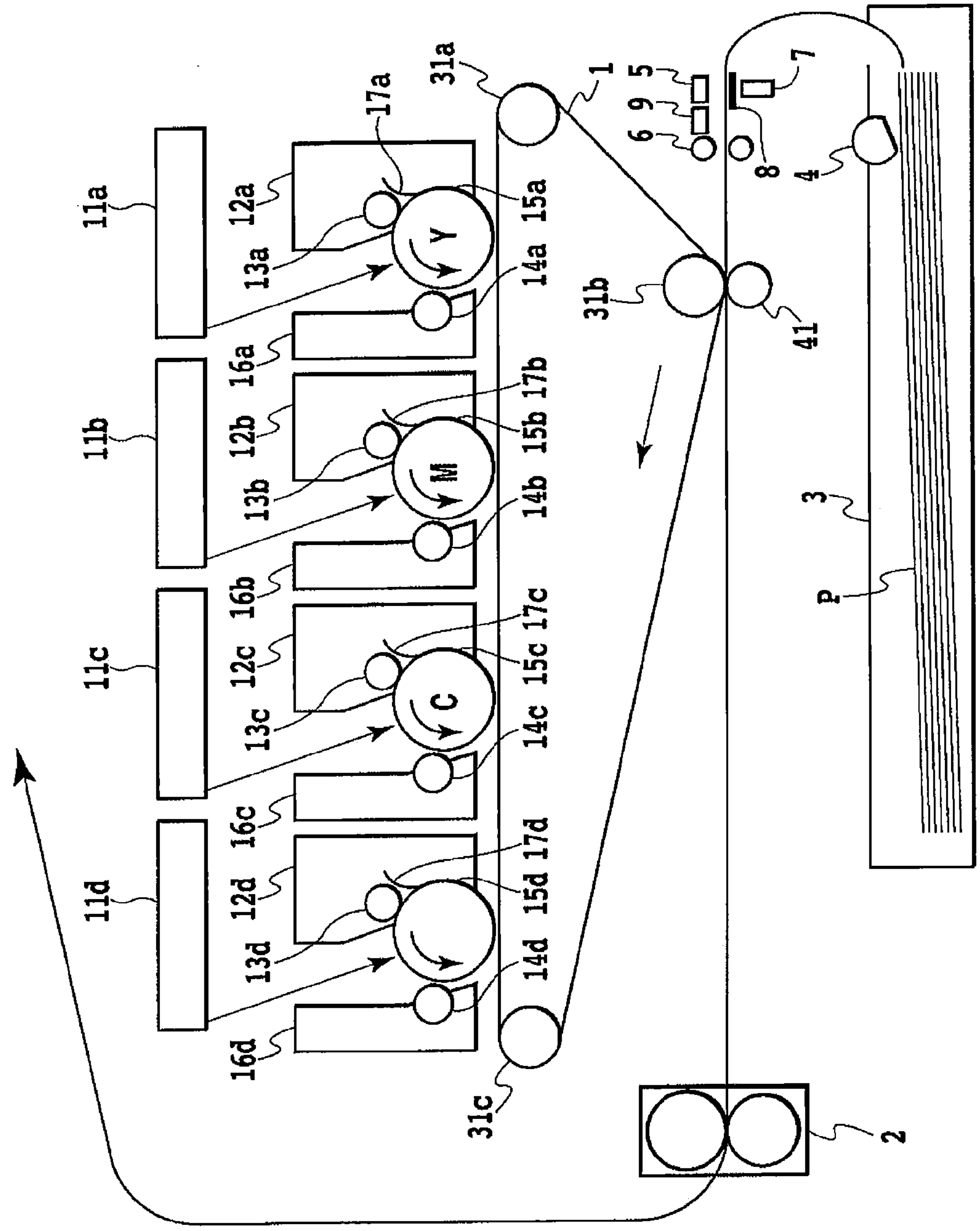
FIG. 1 is a block diagram showing an image forming apparatus of a first embodiment according to the present invention.

Hereafter, embodiments to which the present invention can be applied will be described in detail with reference to the drawings. In each drawing that is referred to in this specification, the same reference numeral is designated to a constituent that performs a similar function.

First Embodiment (Apparatus a Configuration)

A first embodiment of the present invention will be described. FIG. 1 is a diagram showing an image forming apparatus of the first embodiment of the present invention.

FIG. 1 is a diagram showing a configuration of a color image forming apparatus. In the color image forming apparatus shown in FIG. 1, there are arranged four image formation units for respective colors: yellow (Y), magenta (M), cyan (C), and black (Bk). Moreover, an intermediate transfer unit is disposed facing the image formation unit. The image formation units have image carriers 15*a*, 15*b*, 15*c*, and 15*d* and charging means 13*a*, 13*b*, 13*c*, and 13*d* for charging image carriers 15*a*, 15*b*, 15*c*, and 15*d* uniformly at a predetermined potential, respectively. Moreover, the image formation units have laser scanning units 11*a*, 11*b*, 11*c*, and 11*d* for forming electrostatic latent images on the charged image carriers 15*a*, 15*b*, and 15*c* and 15*d* by irradiating laser beams corresponding to color image data thereon, respectively. Moreover, the image formation units have developing units 16*a*, 16*b*, 16*c*, and 16*d* for developing electrostatic latent images formed on the image carriers 15*a*, 15*b*, 15*c*, and 15*d* to develop images therefrom, respectively. Furthermore, the image formation units have sleeve rollers 14*a*, 14*b*, 14*c*, and 14*d* for sending out color toners existing in the developing units 16*a*, 16*b*, 16*c*, and 16*d* to the image carriers 15*a*, 15*b*, 15*c*, and 15*d*, respectively. Still moreover, the image formation units have cleaning units 17*a*, 17*b*, 17*c*, and 17*d* for removing the toners remaining on the image carriers 15*a*, 15*b*, 15*c*, and 15*d* after transfer of the toners, respectively. Reference numerals 12*a*, 12*b*, 12*c*, and 12*d* in the figure denote waste toner units for storing waste toners.

The intermediate transfer unit is equipped with an intermediate transfer body 1, and first-transfers an image formed above to the intermediate transfer body 1. This intermediate transfer body 1 has a transfer roller 31*c* for driving the intermediate transfer body 1, a tension roller 31*a* for giving a tension to the intermediate transfer body 1, and a transfer roller 41 serving as transfer means for second-transferring the image on the recording paper P.

In the lower part of the color image forming apparatus, a sheet paper cassette 3 that houses record media (record materials) P (in this embodiment, sheets used in the image formation, such as regular paper, thick paper, and glossy paper). A conveyance path of a record medium P from the sheet paper cassette 3 is equipped with the pickup roller 4 for feeding paper of the record medium and a paper edge detection sensor 9. The sensor 9 functions as a detection unit for detecting a leading edge of the record medium P, and is equipped with an actuator mechanism for establishing timing of an image formation process.

Figure 12A:
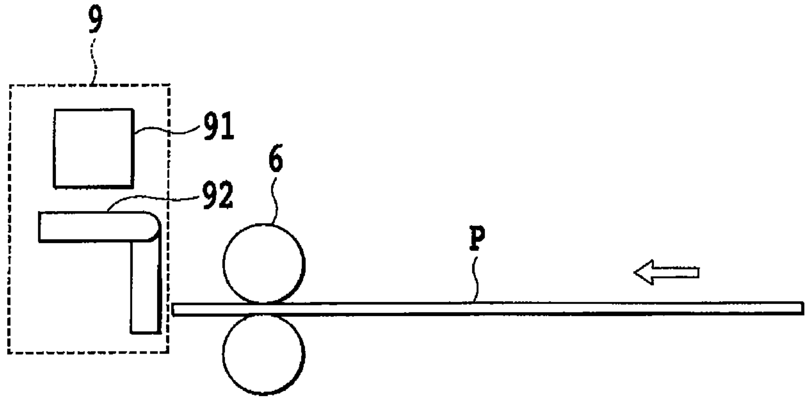
Figure 12B:
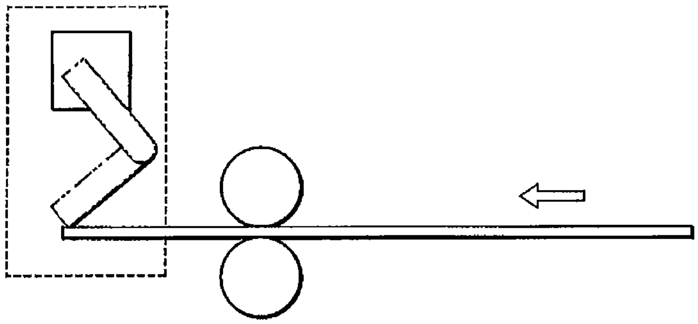
Figure 12C:
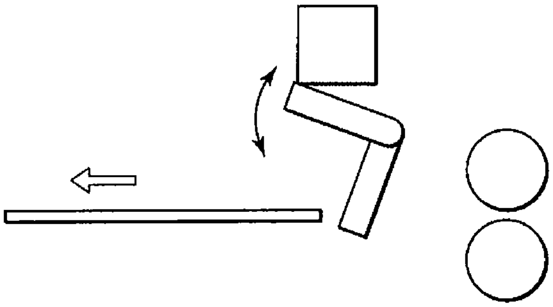

This sensor 9 is a sensor that virtually consists of an actuator (flag) and a photo interrupter and is known conventionally. FIGS. 12A to 12C show states in which the sensor 9 detects a leading edge of the record medium P. A registration roller 6 conveys the record medium P, and a flag 92 of the sensor 9 contacts the leading edge of the record medium P and turns. A turn of the flag makes one end of the flag interrupt a photo interrupter 91, whereby the leading edge of the record medium P is detected (FIG. 12A→FIG. 12B). After this, if the record medium P is conveyed and its trailing edge escapes from the flag, the one end of the flag will turns off the photo interrupter 91. In this occasion, there is a period when the flag flaps and repeats to interrupt the photo interrupter 91 and turns off it (FIG. 12*c*). When an interval between the trailing edge of the next record medium P and the leading edge of the next record medium is shortened in order to increase a conveyance speed of the record medium P, the leading edge of the record medium will hit the flag in a period when the flag flaps. If this would happen, the trailing edge of the record medium could not be captured accurately. To circumvent this problem, a method of optically detecting the trailing edge using a sensor for record medium discrimination that will be described later is adopted in the present invention.

Moreover, the image forming apparatus has the registration roller 6 for making the record medium P stop temporarily and wait in order to take a timing at which a formed image is transferred to the intermediate transfer body 1 from the image carriers 15*a*, 15*b*, 15*c*, and 15*d*. The type of the record material waiting in the registration roller 6 is determined based on a signal obtained from a sensor 5 for record medium discrimination serving as a record medium type detection unit. The sensor 5 for record medium discrimination has a function of discriminating the type of the record medium by detecting a surface state of the record medium and the thickness of the record medium. Then the image formation process is properly timed to a leading edge detection result, the record material is conveyed, and an image formed on the intermediate transfer body is transferred to the record material. At this time, the trailing edge of the record material is detected by an LED 7 and the sensor 5 for record medium discrimination and the size of the record medium is measured during when the record material is being conveyed to.

In addition, a sequence from feeding of the record medium P to size measurement is as follows.

(1) Feeding paper to the record medium P.
(2) Detecting the leading edge of the record medium P with the sensor 9.
(3) Temporarily stopping conveyance of the record medium P.
(4) Detect the type of the record medium P with the sensor 5 for record medium discrimination.
(5) Resuming conveyance of the record medium P in synchronization with an image on the intermediate transfer body.
(6) Detecting the trailing edge of the record medium P by the sensor 5 for record medium discrimination.
(7) Measuring the size from the detection results by the sensor 9 and by the sensor 5 for record medium discrimination.

Figure 14:
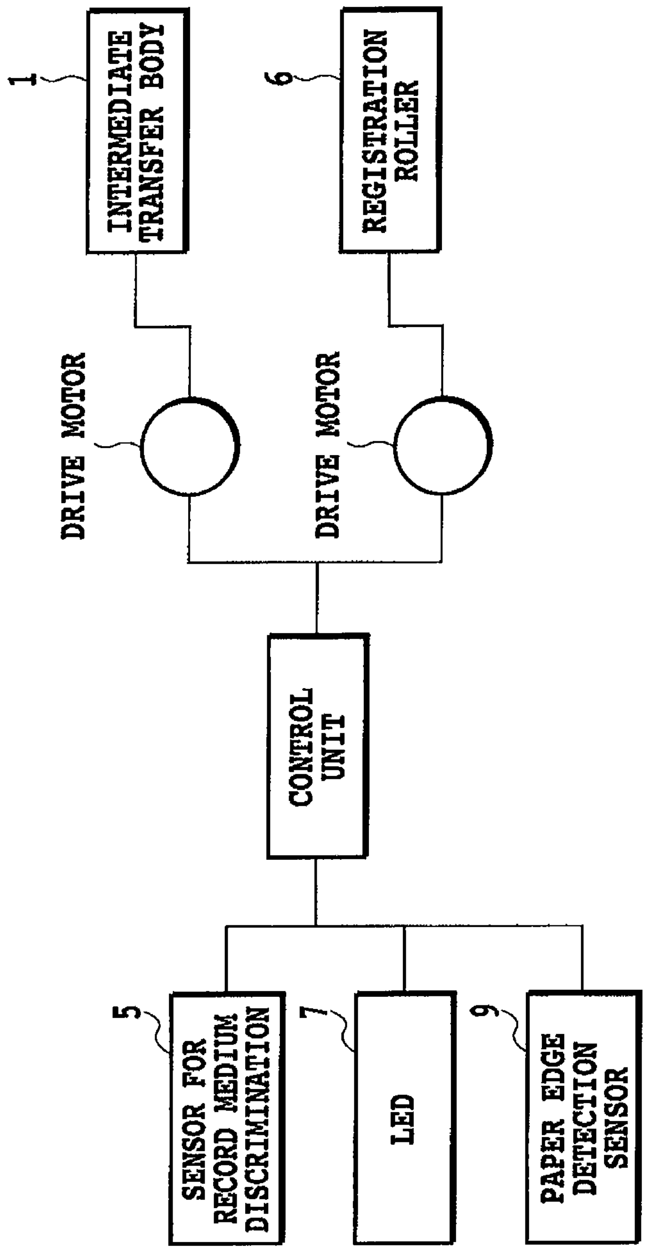
FIG. 14 is a control block diagram of an image forming apparatus according to the present invention.

A control unit that is provided in the image forming apparatus and has a CPU and memory storing a program controls a series of operations, such as feeding of the record material, conveyance, and detection of its type. FIG. 14 shows a control block diagram including the control unit. The control unit of the image forming apparatus is controlling operations of the whole apparatus. As functions related to this embodiment, the control unit has a function of discriminating the type of the record medium by obtaining a signal from the sensor 5 for record medium discrimination and a function of controlling drive operations of the LED 7 for an operation of detecting the type. Moreover, the control unit has a function as a size measuring unit of measuring the size of the record unit by obtaining a signal from the paper edge detection sensor 9. Furthermore, the control unit has a function of controlling a drive of a drive motor that drives the registration roller 6 for conveying the record medium and a function of controlling drive operations of the intermediate transfer body. In addition, the control unit controls operations related to image formation.

Figure 11:
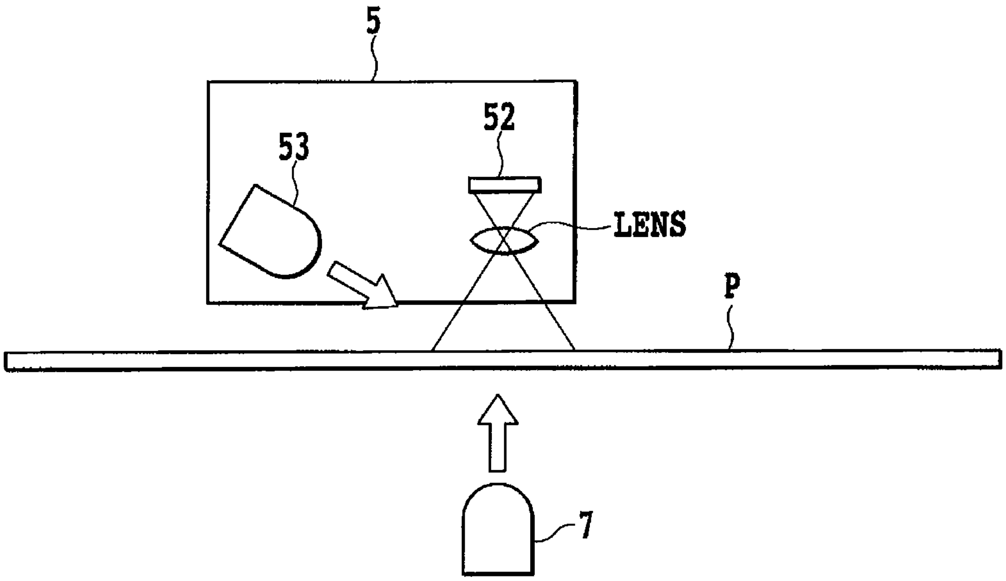
FIG. 11 is a diagram for explaining a configuration of a sensor for record medium discrimination according to the present invention.

The sensor 5 for record medium discrimination has a configuration as shown in FIG. 11. A sensor 52 of the sensor 5 for record medium discrimination is, for example, CCD (Charge-Coupled Device) or CMOS (Complementary Metal-Oxide Semiconductor) sensor. The sensor 52 has a function of detecting a surface state of the record material by detecting light that is irradiated onto the record medium from an LED 53 as a light emitter and is reflected by the record medium. Moreover, the sensor 52 has a function of detecting the thickness of the record medium by detecting light passing through the record medium from the LED 7 as the light emitter. The sensor 52 is reading means for reading the inside of the light irradiation area as a picture and outputting it.

Alternatively, there is also a sensor of a configuration of having a plurality of photo detectors other than the configuration as in FIG. 11. As the record medium discrimination sensor, it is also possible to use, for example, a sensor that virtually consists of a first photo detector disposed at a position where it can receive specular reflection light reflected from the record medium and a second photo detector disposed at a position where it can receive light of an angle different from the incident angle of the light emitter, wherein the two photo detectors detect respective quantities of light.

In the figurer, a reference numeral 2 is fixing means, which fuses and fixes a toner image of four colors transferred onto the record medium P. The record medium P on which the image is fixed is discharged to the outside of the apparatus and the image formation operation is finished. A correction plate 8 plays a role of diffusing light from the LED 7 and a role of detecting how much the output of the sensor 5 for record medium discrimination degrades due to being dusted with use together with a printer. A reflected light output of the correction plate is measured at times of power supply On/OFF, initialization after a door is closed, and during pre-rotation of each print job. The result is compared with the initial output of the correction plate and the last output of the correction plate. According to the rate of variation, the output of the sensor and the quantity of emission of the LED are corrected and record material discrimination is performed.

(Explanation of Operation)

Figure 2:
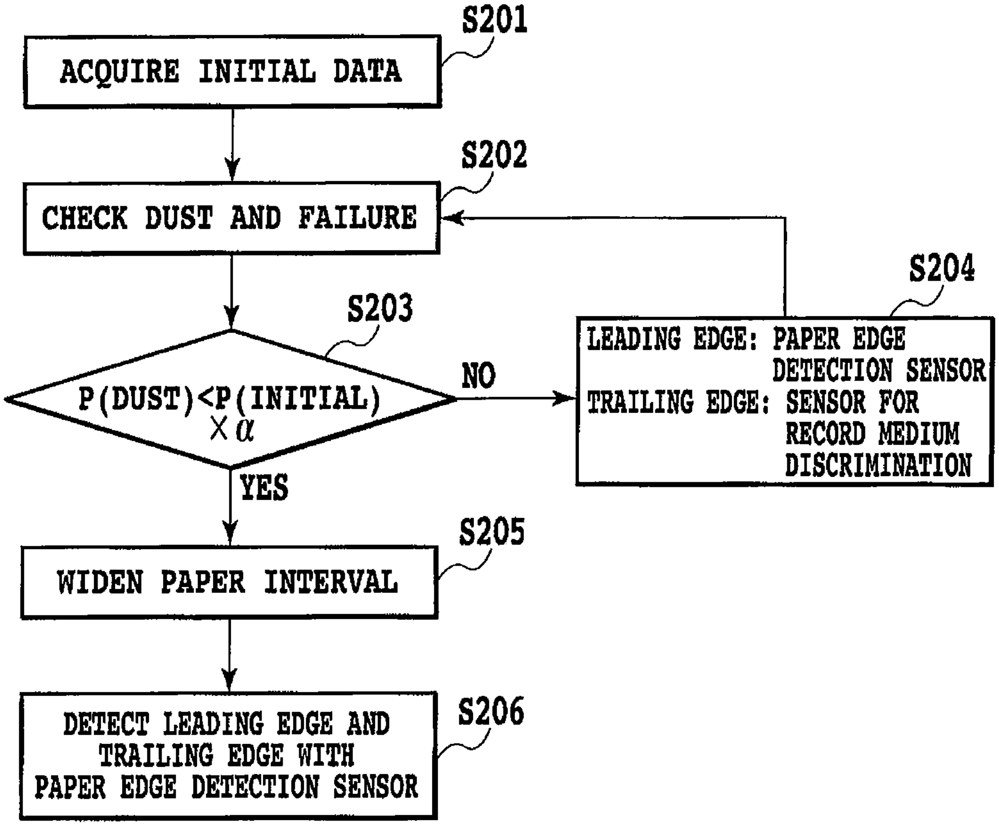
FIG. 2 is a flowchart for explaining a control of the first embodiment according to the present invention.

FIG. 2 is a flowchart describing a procedure for detecting the leading edge and the trailing edge of a record material with the paper edge detection sensor 9. This processing is performed by an unillustrated CPU (central processing unit) executing a control program stored in unillustrated ROM (read-only memory).

The CPU memorizes, at the time of assembly of a main body, the reflected light output (R(initial)) of the correction plate 8 obtained by light emitted from the record medium discrimination sensor in the absence of paper in unillustrated EEPROM. Moreover, the CPU memorizes a transmitted light output (T(initial)) coming from the LED 7 through the correction plate in EEPROM (Electronically Erasable and Programmable Read Only Memory) (Step S201). After that, each time the record material is subjected to printing, it is checked whether the correction plate and the sensor 5 for record medium discrimination are dusted or failing by monitoring the reflected light output of the correction plate or the transmitted light output (Step S202). As the number of prints increases, the toners and paper powder adhere to the optical path of the LED 7, for example, the correction plate and the sensor 5 for record medium discrimination, which will lower the transmitted light output or reduce the quantity of reflected light from the correction plate of the sensor 5 for record medium discrimination in the absence of paper. Moreover, the same phenomenon occurs when unfixed toner adheres the correction plate and the sensor at the time of paper jam or the like.

Consider that the above-mentioned state is detected and the degree of reduction of an output P(dust) (namely, R (dust) and T (dust)) becomes to satisfy the followings (Step S203).

$$\text{(after dust occurrence)} < R\ \text{(initial)} \times \alpha\ (\alpha < 1)$$

$$\text{(after dust occurrence)} < T\ \text{(initial)} \times \alpha$$

Here, α is a coefficient for setting up a reference value for determining the degree of dirt, for example, being a value of 0.9, etc.

In this case, the CPU performs a control to widen an interval $\beta$ between pieces of the record materials to a minimum paper interval $\gamma$ ($\beta<\gamma$) so that it can be detected only by the paper edge detection sensor 9 (Step S205) and to detect the leading edge and the trailing edge (Step S206).

If the above-mentioned formula is not satisfied, the leading edge and the trailing edge are detected, as before, by the paper edge detection sensor 9 and by the transmitted light output of the sensor 5 for record medium discrimination (Step S204).

Similarly, in a system of detecting dust by adjusting the sensor 5 for record medium discrimination and the quantity of light of the LED 7, when the transmitted light varies from the initial state by $\alpha$, the apparatus performs a control such that the paper interval is widened to $\gamma$ and the leading edge and the trailing edge of the record material are detected by the paper edge detection sensor 9.

Incidentally, regarding the record material discrimination, detection accuracy of the transmitted light is lowered or the transmitted light cannot be detected, and accordingly the record material is discriminated only by the reflected light output.

Figure 3A:
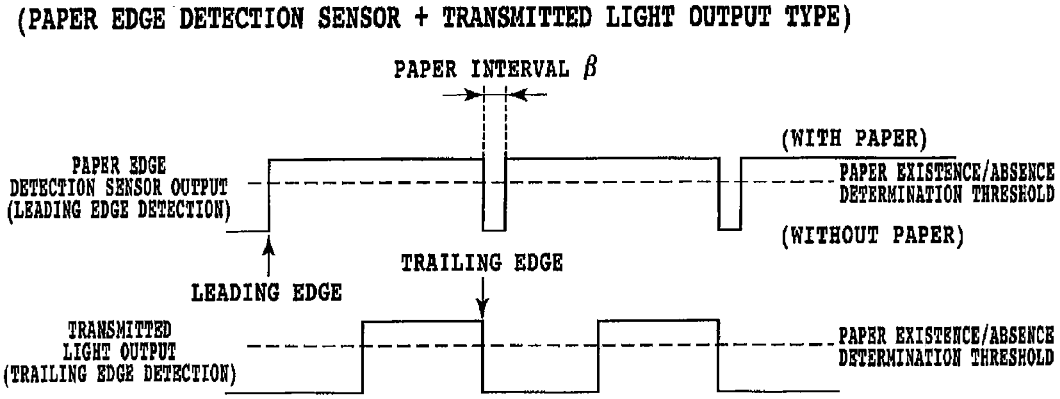
Figure 3B:
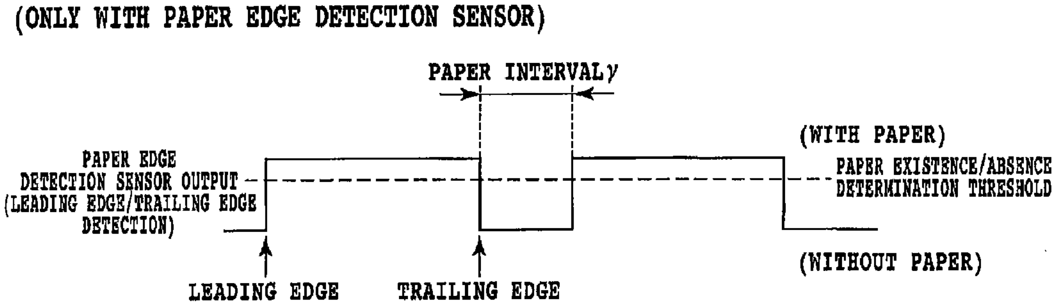
Figure 3C:
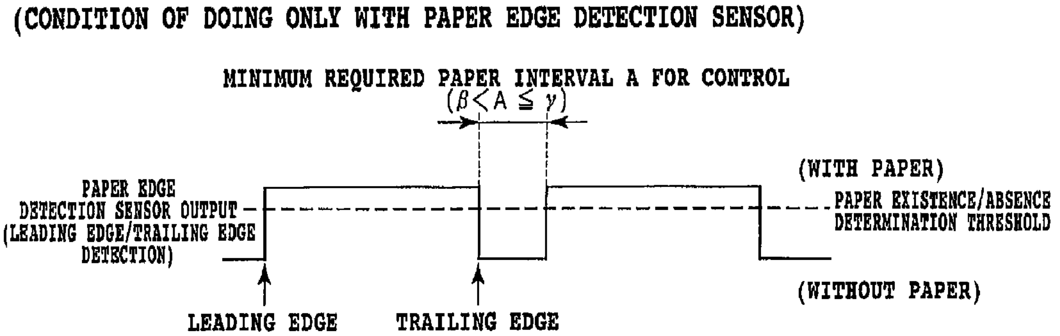

FIGS. 3A to 3C show timing charts in the case where the paper interval is widened using the paper edge detection sensor 9.

In a case where detection is performed with the paper edge detection sensor 9 and the quantity of transmitted light, the leading edge of the record material is detected and the LED 7 is turned on after a predetermined time. Then the trailing edge of the paper can be detected by the paper crossing the optical path of the LED 7, and the size of the record material can be measured (FIG. 3A).

If the trailing edge is intended to be detected only by the sensor 9, the paper interval needs to be widened to more than $\beta$. As a reason of this, if the record material is conveyed maintaining a paper interval of $\beta$, a time required for the actuator (flag) mechanism to go back to the initial position and a time required the flag to come to stop after the flag goes back will affect a chattering removal time. Therefore, since there is the possibility that the leading edge of the next record material can be no longer detected with a paper interval of $\beta$, the size is found to be longer than the size of the record material that was actually conveyed. Then conveyance will stop because of disagreement of the size of the record material. Therefore, in order to measure the size of the record material accurately, the paper interval is widened to a paper interval Y equal to or more than a minimum paper interval A (FIG. 3C) with which the leading edge and the trailing edge of the record material can be detected only by the sensor 9. Now, it becomes possible to measure the paper size by detecting the leading edge and the trailing edge only with the paper edge detection sensor 9 (FIG. 3B).

As described above, according to this embodiment, the image forming apparatus is configured to, when the output decreases from the initial state by a predetermined rate because of the correction plate and the record medium determination sensor, detect both the leading edge and the trailing edge by enlarging the paper interval only with the paper edge detection sensor, malfunction of operations of the apparatus can be prevented before it occurs.

Second Embodiment

A second embodiment of the present invention will be described. Regarding the similar constituents as those of the first embodiment (FIG. 1 etc.), their explanations are omitted.

This embodiment differs from the first embodiment in that, when the correction plate 8 gets dusted and an output of the record medium discrimination sensor is lowered from the initial state by a certain rate, the apparatus issues a warning to a user that the record medium discrimination sensor was dusted and urges the user to clean away the dust.

Figure 4:
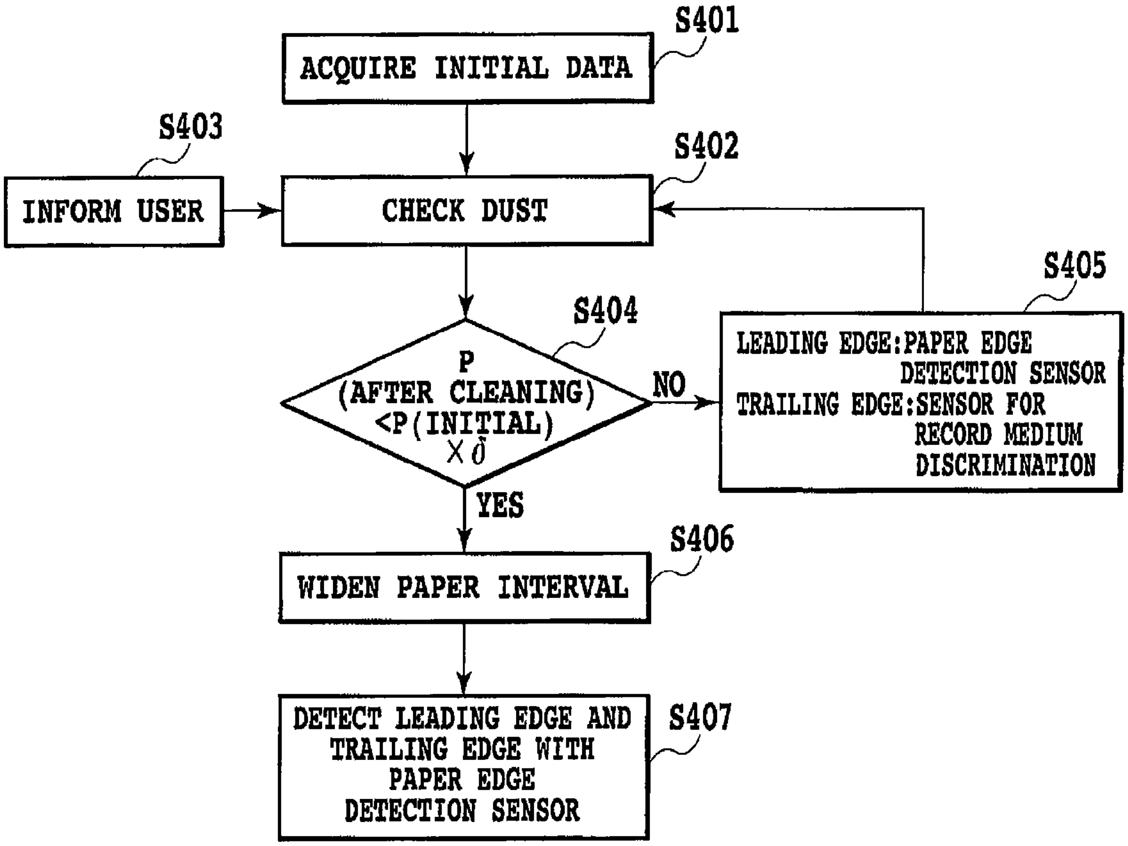
FIG. 4 is a flowchart for explaining a control of a second embodiment according to the present invention.

FIG. 4 is a flowchart describing a processing procedure of this embodiment. This processing is performed by an unillustrated CPU executing a control program stored in unillustrated ROM.

The CPU acquires initial data at the time of assembly of the main body, and memorizes it in EEPROM (not illustrated) (Step S401). The reflected light output from the correction plate 8 and the transmitted light output from the LED 7 are obtained in the absence of the record material for the following occasions: at the time of power supply ON/OFF; after the door is closed; or at the time of starting each print job (Step S402). If the current outputs as compared with the reflected light output and the transmitted light in the pervious state of the correction plate 8 make ratios equal to or more than $\theta$ (<100%), respectively, the apparatus outputs on the operation panel a warning indicating dust and directs the user to clean it away (Step S403). When the user recognizes the warning, cleans the record medium discrimination sensor and the correction plate, and measures the output of the correction plate again, if the output is "initial state P(initial)×δ(θ<δ) or more" (namely, satisfying not of P(dust after cleaning)<P(initial)×δ) (Step S404), the warning is canceled. Then leading edge detection of the record material is performed by the paper edge detection sensor 9, and trailing edge detection is performed using the quantity of transmitted light from the LED 7 (Step S405).

Incidentally, a value of $\delta$ becomes a value larger than the value of $\alpha$ explained in the first embodiment ($\alpha<\delta$).

Also in the system that detects dust by adjusting the sensor 5 for record medium discrimination and the quantity of light of the LED 7, the same control as described above is performed.

However, if the user is not aware of the warning of dust and the correction plate remains dusted at the time of the next print, the CPU widens the interval between pieces of the record material to a minimum paper interval $\gamma$ ($\beta<\gamma$) that can be detected only by the paper edge detection sensor 9 (Step S406). Then a control is so performed that the leading edge and the trailing edge may be detected (Step S407). Incidentally, like the first embodiment, the record material discrimination is performed only by means of the reflected light output.

If when some moment has elapsed after the warning, the user detects that the sensor 5 for record medium discrimination and the correction plate 8 are cleaned, the leading edge and the trailing edge of the record material are tried to be detected as described above.

As described above, according to this embodiment, when the correction plate and the sensor are dusted by the toners, the paper powder, etc., the apparatus makes a warning indicating a dusted sensor and urges the user to clean them. This processing makes it possible to detect the leading edge and the trailing edge of the record material without lowering the throughput and perform the size measurement. Moreover, when the user does not clean the correction plate and the sensor, the apparatus widens the paper interval so that the paper edge detection sensor can detect the leading edge and the trailing edge, which can prevent malfunction in operations of the apparatus from happening.

Third Embodiment

A third embodiment of the present invention will be described. The same constituents as those in the first and second embodiments are designated by the same reference numerals and their explanations are omitted.

This embodiment differs from the first and second embodiments in that the trailing edge detection sensor is a reflection type sensor that does not have a function as the record medium discrimination sensor.

Figure 5:
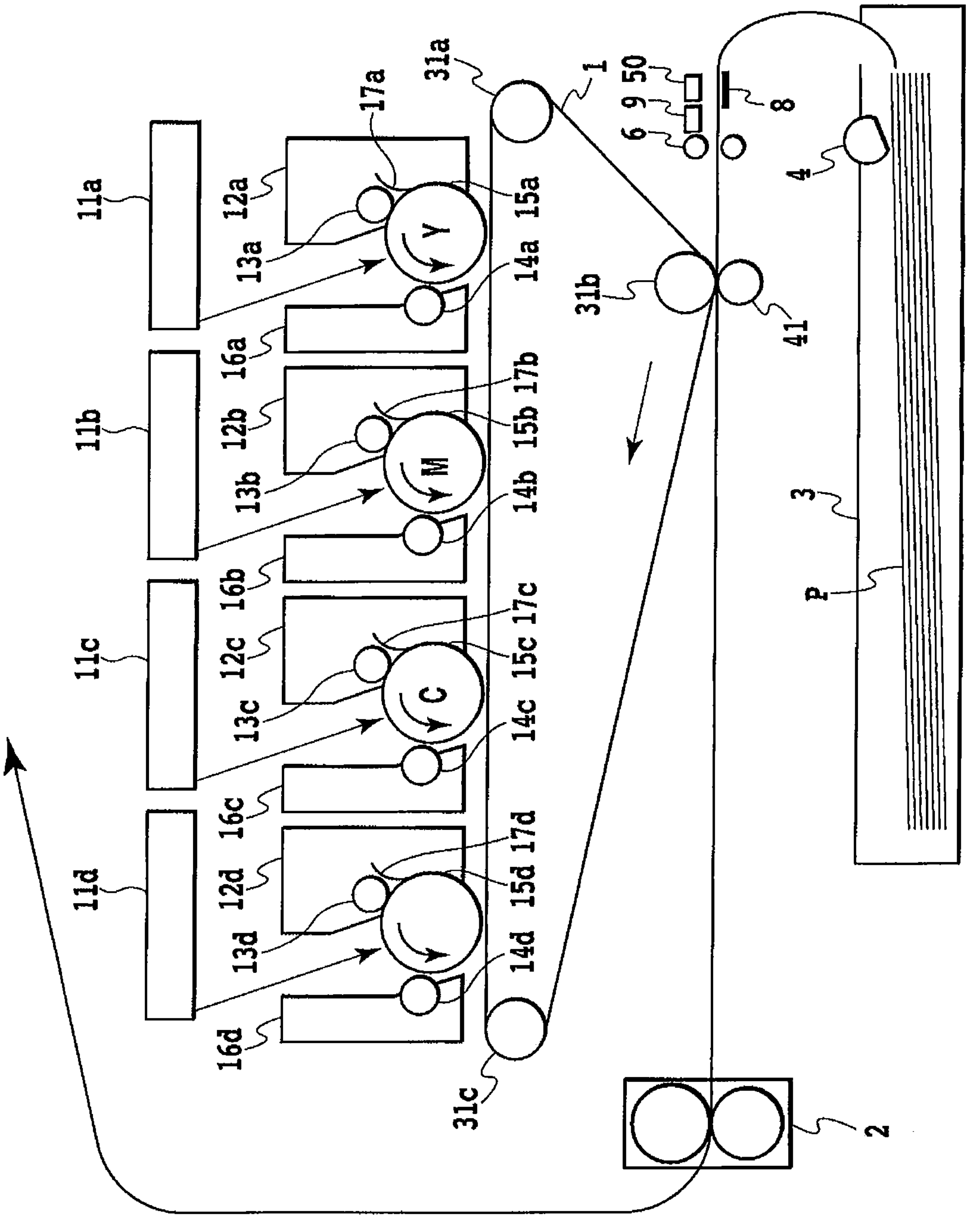
FIG. 5 is an image forming apparatus of a third embodiment according to the present invention.
Figure 6:
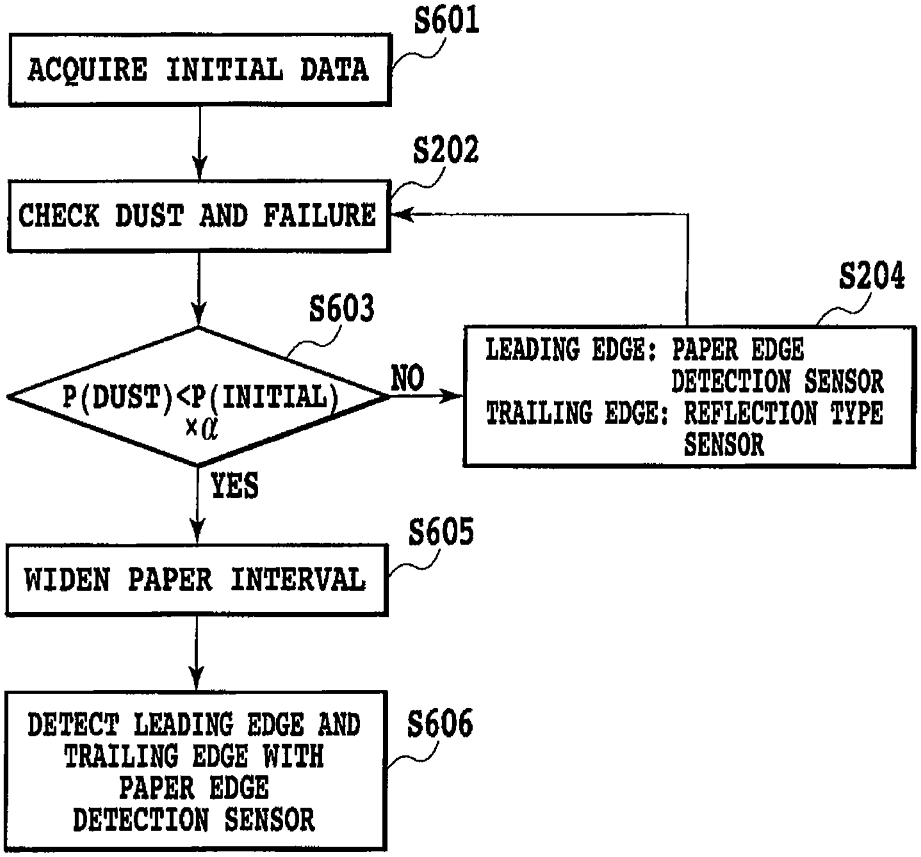
FIG. 6 is a flowchart for explaining a control of the third embodiment according to the present invention.
Figure 7:
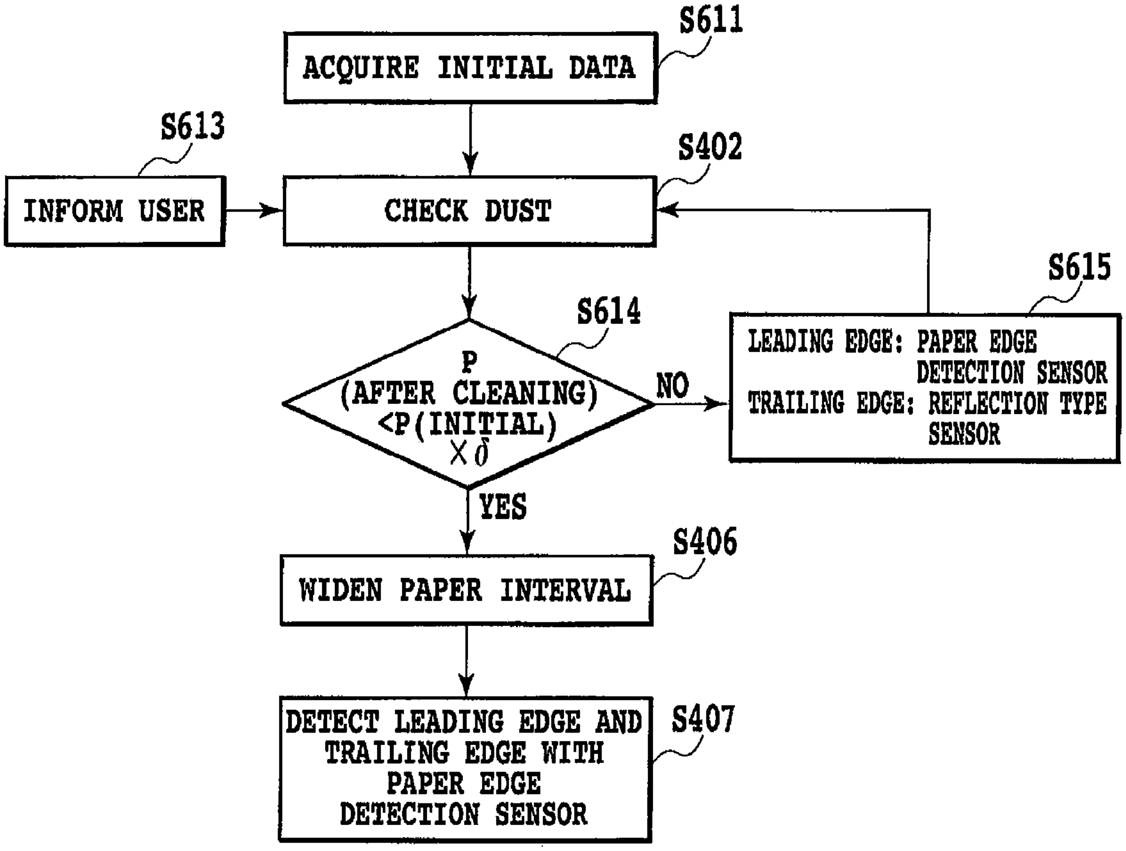
FIG. 7 is a flowchart for explaining a control of the third embodiment according to the present invention.

FIG. 5 is a block diagram of the image forming apparatus according to this embodiment, and FIGS. 6 and 7 are flowcharts each describing a processing procedure in this embodiment. This processing is performed by an unillustrated CPU executing a control program stored in unillustrated ROM.

In FIG. 5, a reflection type sensor 50 is a sensor whose angle of receiving light is the same as the irradiation angle of light onto the record material, and by this sensor, the trailing edge of the record material is detected. The reflection type sensor 50 virtually consists of irradiating means capable of irradiating the surface of the record material from a slanting direction with an arbitrary quantity of light and light receiving means disposed at a position at which it can receive specular reflection light of the light source. This sensor 50 is a sensor that receives the light irradiated from the irradiating means and reflected by the record material and determines existence/absence of the record material.

In FIGS. 6 and 7, the CPU memorizes an output of the reflection type sensor from the correction plate at the time of assembly of the main body in memory means, such as EEPROM (not illustrated) (Step S601). When there occurs the degree of lowering of the output such that the output becomes lower than the initial output by a factor $\alpha$ (<1) (namely, P(dust)<P(initial)×$\alpha$) (Step S603), the paper interval is widened (Step S605). Then the apparatus switched a control mode to a control mode in which the leading edge and the trailing edge of the record material are detected by the paper edge detection sensor 9 (Step S606).

Moreover, when dust is detected by an output from the correction plate of the reflection type sensor, the apparatus gives the user a warning (Step S613) and urges the user to clean the reflection type sensor and the correction plate. After the cleaning, if the output of the correction plate measured again satisfies "being $\delta$ ($\theta$<$\delta$) times the initial state" or more (namely, not satisfying: P(dust after cleaning)<P(initial)×$\delta$) (Step S614), the leading edge and the trailing edge of the record material are detected by the paper edge detection sensor 9 and the reflection type sensor 50 (Step S615). By this method, the size can be measured by detecting the leading edge and the trailing edge of the record material without lowering throughput.

According to this embodiment, as described above, the same effect as that of the first and second embodiments of the image forming apparatus according to the above-mentioned present invention can be acquired.

Fourth Embodiment

A fourth embodiment of the present invention will be explained. The same constituents as those of the first and second embodiments are designated by the same reference numerals and their explanations are omitted.

This embodiment differs from the first and second embodiments in that the trailing edge detection sensor is a transmission type sensor without a function as the record medium discrimination sensor.

Figure 8:
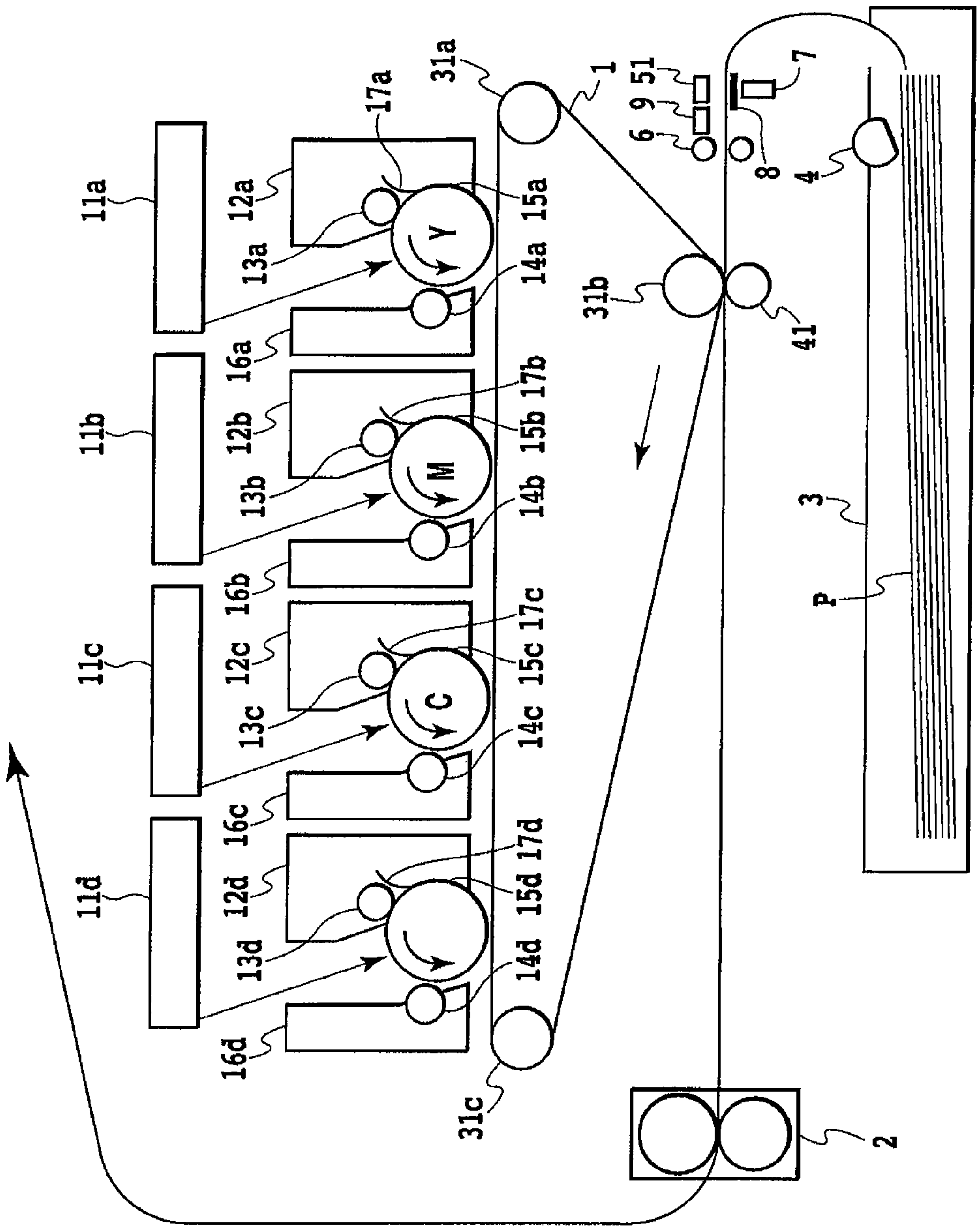
FIG. 8 is an image forming apparatus of a fourth embodiment according to the present invention.
Figure 9:
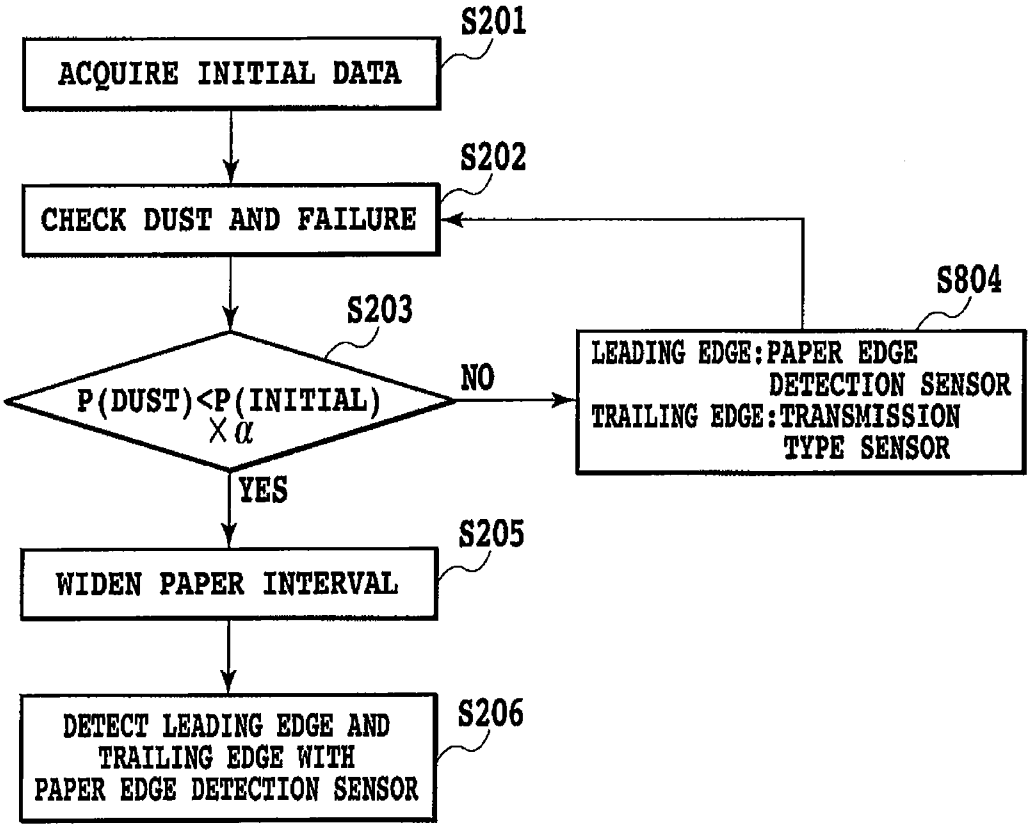
FIG. 9 is a flowchart for explaining a control of the fourth embodiment according to the present invention.
Figure 10:
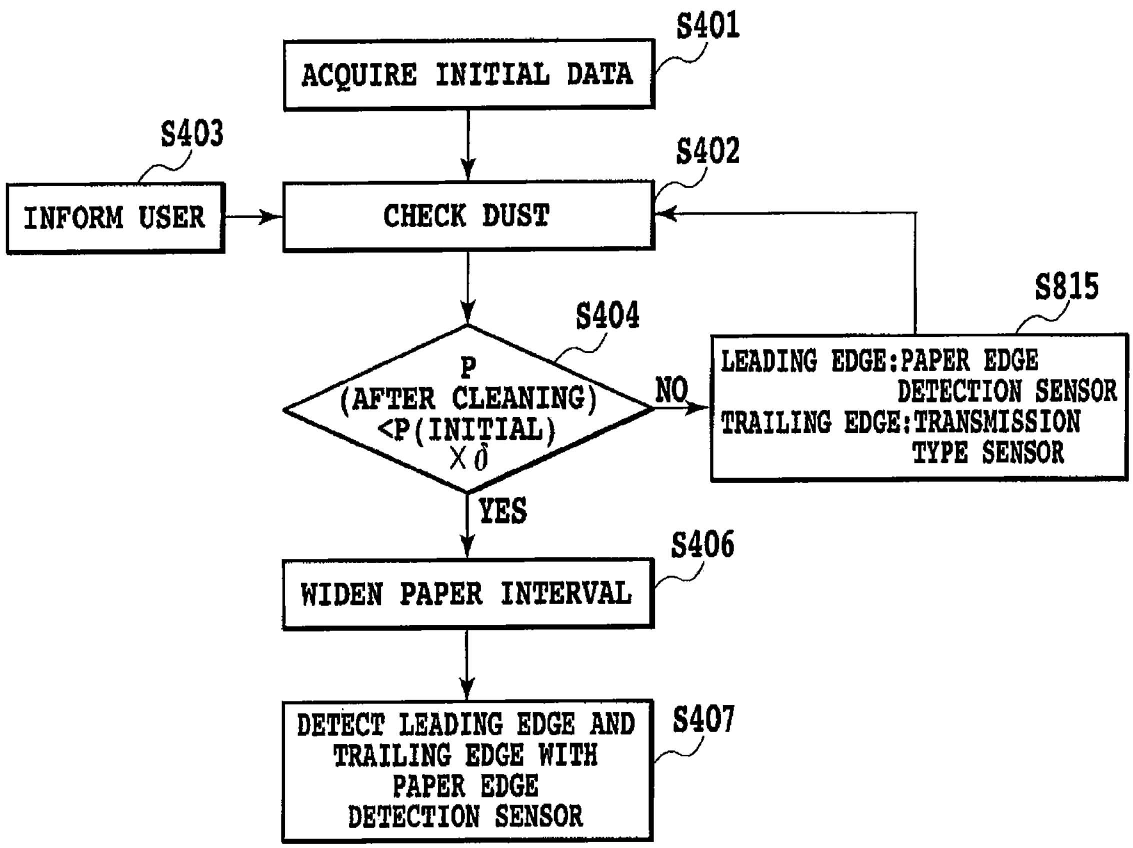
FIG. 10 is a flowchart for explaining a control of the fourth embodiment according to the present invention.

FIG. 8 is a block diagram of the image forming apparatus in this embodiment and FIGS. 9 and 10 are flowcharts describing a processing procedure in this embodiment. This processing is performed by an unillustrated CPU executing a control program stored in unillustrated ROM.

In FIG. 8, the LED 7 is a light emitter for detecting the trailing edge of the record material, and a transmission type sensor 51 is a photo detector for receiving light from the LED 7 and is a phototransistor etc. The transmission type sensor 51 has a configuration having a light emitter and a photo detector arranged in a direction perpendicular to the conveyance direction of the record material.

In FIGS. 9 and 10, a detection method, contents of control, etc. are the same as in the first and second embodiments except for a point that processing in Steps S804 and S815 is done by the transmission type sensor 51 instead of the sensor 5 for record medium discrimination.

As described above, according to this embodiment, the same effect as that of the first and second embodiments of the image forming apparatus according to the above-mentioned present invention can be obtained.

Fifth Embodiment

This embodiment is characterized in that a method for measuring the size of the record material is determined based on a discrimination result on the type of the record material by the sensor 5 for record medium discrimination explained in the first embodiment.

As types of the record material to be discriminated by the sensor 5 for record medium discrimination, there are regular paper, thick paper, glossy paper, etc., for example. Here, let the image formation speed be unity in the case where the record material is discriminated as regular paper, for example. The speed of thick paper will be set to ¾ times the speed of regular paper, i.e., thick paper is slower than regular paper, and the speed of glossy paper will be set to ½ time the speed of regular paper, for example. This is because in the cases of thick paper and glossy paper, the speed is made slower so that an image may be sufficiently fixed to the record medium in a fixing process. In the case where the speed in fixing an image to the record medium is slowed, the conveyance is so set that a conveyance interval (paper to paper) of the record medium may be widened.

This embodiment is characterized in that, when the type of the record medium was discriminated to be either thick paper or glossy paper by the sensor 5 for record medium discrimination, it is determined that the conveyance speed is set slow and the trailing edge of the record medium is detected by the paper edge detection sensor.

Figure 13:
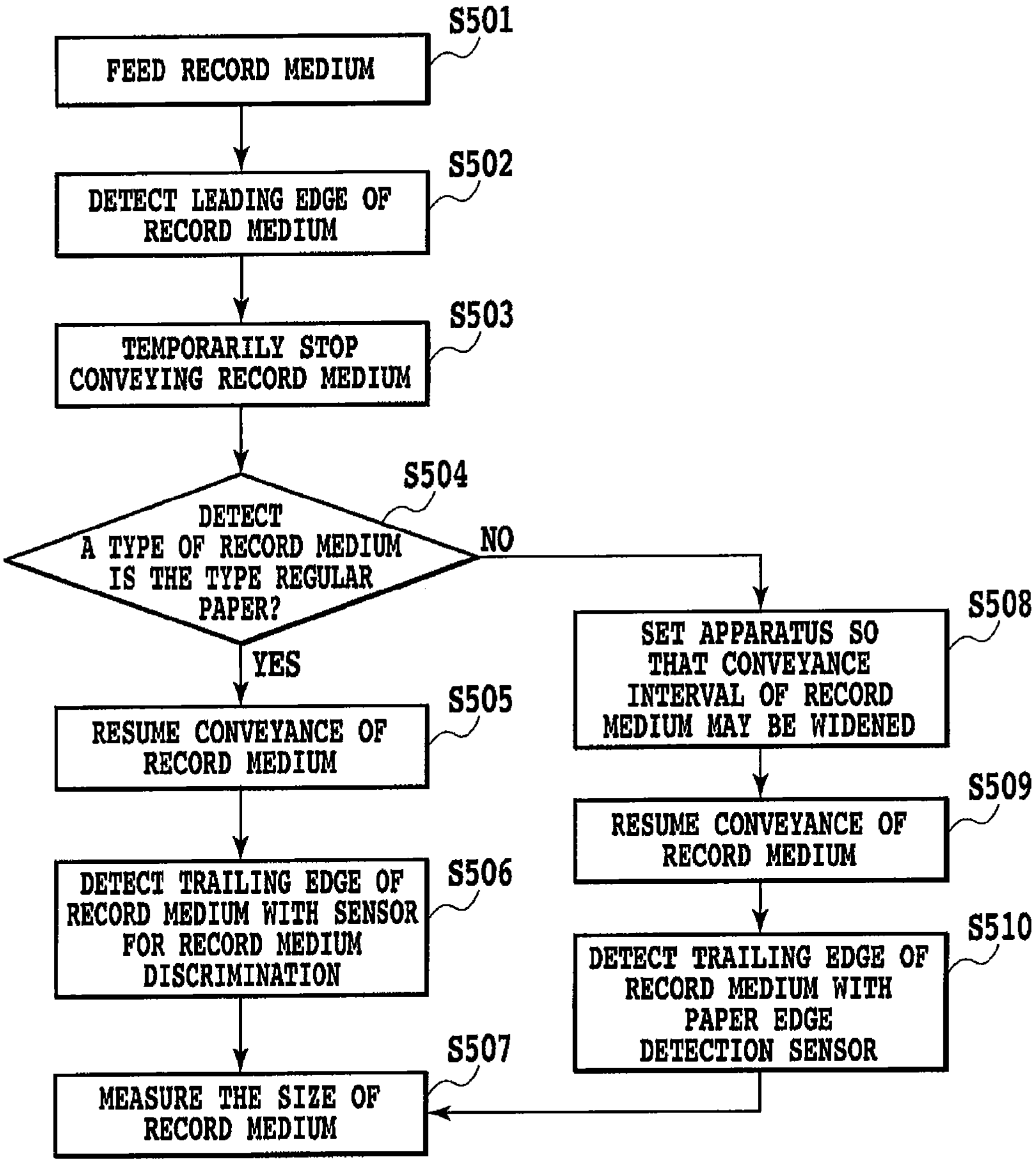
FIG. 13 is a flowchart for explaining a control of a fifth embodiment according to the present invention.

Operations of this embodiment will be explained using a flowchart of FIG. 13.

The record medium P is fed (Step S501), the record medium P is conveyed, its leading edge reaches the paper edge detection sensor 9, and the leading edge is detected (Step S502). Subsequently, conveyance of the record medium P is temporarily stopped (Step S503), and the type of record medium P is detected by the sensor 5 for record medium discrimination (Step S504). Then it is determined whether the type of the record medium P is regular paper (Step S504). If it is regular paper, conveyance of the record medium is resumed (Step S505), and subsequently the trailing edge of the record medium P is detected by the sensor 5 for record medium discrimination (Step S506). Then the size of the record medium P is measured from the detection results by the paper edge detection sensor 9 and by the sensor 5 for record medium discrimination (Step S507).

When the type of record medium P is not regular paper, i.e., when it is either thick paper or glossy paper, the conveyance is so set that the conveyance interval of the record medium may be expanded (Step S508). This is because, as described above, in the cases of thick paper and glossy paper, the speed is slowed down in order that it is fixed sufficiently when an image is fixed to the record medium. Then conveyance of the record medium is resumed (Step S509), and the trailing edge of the record medium P being conveyed is detected by the paper edge detection sensor 9. Detecting the trailing edge of the record medium P with the paper edge detection sensor 9 in order to widen the conveyance interval has no problem, and such detection is possible. Then the size of the record medium P is measured from the detection result of the paper edge detection sensor 9 (Step S510).

As described above, in this embodiment, since it is determined so that the trailing edge of the record medium may be detected according to the type of the record medium, it becomes possible to reduce frequency of use of the record medium discrimination sensor and thereby prevent degradation caused by its use.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2006-204595, filed Jul. 27, 2006 which is hereby incorporated by reference herein in its entirety.

What is claimed is:

1. An image forming apparatus, comprising:

an image formation unit for forming an image on a recording paper;

a conveyance unit for conveying the recording paper;

a first detection unit for detecting a leading edge of the recording paper;

a second detection unit for detecting a trailing edge of the recording paper;

wherein the conveyance unit conveys a plurality of the recording papers at a first conveyance interval;

the trailing edge of the plurality of the recording papers which are conveyed at the first conveyance interval is detected by the second detection unit; and when a predetermined output is not obtained from the second detection unit, the conveyance unit changes the first conveyance interval to a second conveyance interval which is larger than the first conveyance interval, thereby detecting the trailing edge by the first detection unit.

2. The image forming apparatus according to claim 1, wherein degradation or failure of the second detection unit is detected based on a degree of reduction in an output from the second detection unit that is lowered from the initial state of output.

3. The image forming apparatus according to claim 2, wherein when the second detection unit degrades or fails, the apparatus notifies a user of the degradation or failure.

4. The image forming apparatus according to claim 1, wherein the second detection unit detects a type of the recording paper.

5. The image forming apparatus according to claim 4, wherein the second detection unit includes a light emitter and a photo detector, and the photo detector reads a surface of the recording paper as a picture.

6. The image forming apparatus according to claim 4, comprising:

wherein when the type of recording paper detected by the second detection unit is of a predetermined type, the first detection unit detects both the leading edge and the trailing edge of the recording paper and when the type of the recording paper detected by the second detection unit is not of the predetermined type, the first detection unit detects the leading edge of the recording paper and the second detection unit detects the trailing edge of the recording paper; and a conveyance speed of the recording paper in cases where the recording paper is of the predetermined type is slower than a conveyance speed of the recording paper in cases where the recording paper is not of the predetermined type.

7. The image forming apparatus according to claim 6, wherein when the second detection unit detects that the type of the recording paper is either thick paper or glossy paper, the recording paper is conveyed by the conveyance unit at a conveyance speed slower than a conveyance speed in a case where the type of the recording paper is a regular paper, and the leading edge and the trailing edge of the recording paper are detected using only the first detection unit.

8. The image forming apparatus according to claim 4, wherein the second detection unit has a light emitter and a photo detector, and detects the type of the recording paper based on an amount of light read by the photo detector which is transmitted through the recording paper.

9. The image forming apparatus according to claim 4, wherein the second detection unit has a light emitter and a photo detector, and detects the type of the recording paper based on an amount of light read by the photo detector which is reflected by the recording paper.

10. The image forming apparatus according to claim 1, wherein the first detection unit has a flag which contacts the recording paper, and detects an edge of the recording paper by detecting the flag.

11. The image forming apparatus according to claim 1, wherein the first detection unit has a flag which contacts the recording paper, and detects the edge of the recording paper by detecting the flag.

12. The image forming apparatus according to claim 1, further comprising a size detection unit configured to detect a size of the recording paper in the conveyance direction by detecting a plurality of recording papers conveyed at the first conveyance interval using the first detection unit and the second detection unit.

13. An image forming apparatus comprising:

an image formation unit for forming an image on a recording paper;

a conveyance unit for conveying the recording paper;

a first detection unit for detecting an edge of the recording paper; and a second detection unit for detecting an edge of the recording paper;

wherein when a predetermined output is obtained from the second detection unit, an interval between a trailing edge of a first recording paper being conveyed and a leading edge of a second recording paper being subsequently conveyed is set to a first interval, thereby detecting the leading edge by the first detection unit and detecting the trailing edge by the second detection unit; and when the predetermined output is not obtained from the second detection unit, the interval is set to a second interval that is larger than the first interval, and the first detection unit detects both the leading edge and the trailing edge of the recording paper.

14. The image forming apparatus according to claim 13, wherein the second detection unit is an optical sensor, and wherein when an output from the optical sensor is decreased, the first interval is switched to the second interval that is wider than the first interval, and the first detection unit detects both the leading edge and the trailing edge of the recording paper.

15. The image forming apparatus according to claim 13, wherein the second detection unit has a light emitter and a photo detector, and detects a type of the recording paper based on the amount of light read by the photo detector which is transmitted through the recording paper.

16. The image forming apparatus according to claim 13, wherein the second detection unit has a light emitter and a photo detector, and detects a type of the recording paper based on the amount of light read by the photo detector which is reflected by the recording paper.

17. The image forming apparatus according to claim 13, wherein the first detection unit has a flag which contacts the recording paper, and detects the edge of the recording paper by detecting the flag.

18. A conveyance device comprising:

a conveyance unit for conveying a recording paper;

a first detection unit for detecting an edge of the recording paper; and a second detection unit for detecting an edge of the recording paper;

wherein when a predetermined output is obtained from the second detection unit, an interval between a trailing edge of a first recording paper being conveyed and a leading edge of a second recording paper being subsequently conveyed is set to a first interval, thereby detecting the leading edge by the first detection unit and detecting the trailing edge by the second detection unit; and when a predetermined output is not obtained from the second detection unit, the interval is set to a second interval that is larger than the first interval, and the first detection unit detects both the leading edge and the trailing edge of the recording paper.

19. An image forming apparatus comprising:

an image formation unit for forming an image on a recording paper;

a conveyance unit for conveying the recording paper;

a first detection unit for detecting an edge of the recording paper; and a second detection unit for detecting an edge of the recording paper;

wherein when a predetermined output is obtained from the second detection unit, an interval between a trailing edge of a first recording paper being conveyed and a leading edge of a second recording paper being subsequently conveyed is set to a first interval, thereby detecting the leading edge by the first detection unit and detecting the trailing edge by the second detection unit;

the first recording paper and the second recording paper are a recording paper other than an OHT sheet; and when the predetermined output is not obtained from the second detection unit, the interval is set to a second interval that is larger than the first interval, and the first detection unit detects both the leading edge and the trailing edge of the recording paper.

20. A conveyance device comprising:

a conveyance unit for conveying a recording paper;

a first detection unit for detecting an edge of the recording paper; and a second detection unit for detecting an edge of the recording paper;

wherein when a predetermined output is obtained from the second detection unit, an interval between a trailing edge of a first recording paper being conveyed and a leading edge of a second recording paper being subsequently conveyed is set to a first interval, thereby detecting the leading edge of the first detection unit and detecting the trailing edge by the second detection unit;

the first recording paper and the second recording paper are a recording paper other than an OHT sheet; and when a predetermined output is not obtained from the second detection unit, the interval is set to a second interval that is larger than the first interval, and the first detection unit detects both the leading edge and the trailing edge of the recording paper.

* * * * *